(12) United States Patent
Harley et al.

(10) Patent No.: US 10,689,591 B2
(45) Date of Patent: Jun. 23, 2020

(54) FLAME-RESISTANT ADDITIVES FOR OIL-BASED PRODUCTS AND OIL-BASED PRODUCTS CONTAINING FLAME-RESISTANT ADDITIVES

(71) Applicant: FirstPower Group, LLC, Twinsburg, OH (US)

(72) Inventors: John W. Harley, Peninsula, OH (US); Robert H. Kinner, Twinsburg, OH (US)

(73) Assignee: FIRSTPOWER GROUP, LLC, Twinsburg, OH (US)

( * ) Notice: Subject to any disclaimer, the term of this patent is extended or adjusted under 35 U.S.C. 154(b) by 59 days.

(21) Appl. No.: 16/114,386

(22) Filed: Aug. 28, 2018

(65) Prior Publication Data

US 2019/0062662 A1 Feb. 28, 2019

Related U.S. Application Data

(60) Provisional application No. 62/552,668, filed on Aug. 31, 2017.

(51) Int. Cl.
| | | |
|---|---|---|
| *C10M 129/52* | (2006.01) | |
| *C10M 169/04* | (2006.01) | |
| *C08L 23/02* | (2006.01) | |

(52) U.S. Cl.
CPC ........ *C10M 129/52* (2013.01); *C10M 169/04* (2013.01); *C08L 23/02* (2013.01); *C08L 2201/02* (2013.01); *C10M 2203/1006* (2013.01); *C10M 2205/043* (2013.01); *C10M 2207/142* (2013.01); *C10M 2207/2805* (2013.01); *C10M 2207/2835* (2013.01); *C10M 2207/2895* (2013.01); *C10M 2207/401* (2013.01); *C10N 2230/06* (2013.01); *C10N 2230/12* (2013.01); *C10N 2230/40* (2013.01); *C10N 2250/04* (2013.01); *C10N 2270/02* (2013.01)

(58) Field of Classification Search
CPC ............ C10M 129/52; C10M 2207/14; C10M 169/04; C10M 2203/1006; C10M 2205/043; C10M 2207/142; C10M 2207/2805; C10M 2207/2835; C10M 2207/2895; C10N 2230/06; C10N 2230/12; C10N 2230/40; C10N 2250/04; C10N 2270/02; C08L 23/02; C08L 2201/02

See application file for complete search history.

(56) References Cited

U.S. PATENT DOCUMENTS

2006/0073993 A1* 4/2006 Culley ................. C10L 1/1881
508/519
2016/0222312 A1* 8/2016 Iwai ..................... C10M 159/22

OTHER PUBLICATIONS

Safety Data Sheet, FirstPower Group LLC EZ Reach Oil, Date of Issue May 18, 2015.

\* cited by examiner

*Primary Examiner* — James C Goloboy
(74) *Attorney, Agent, or Firm* — Emerson, Thomson & Bennett, LLC; Roger D. Emerson; Peter R. Detorre

(57) ABSTRACT

The present disclosure relates to an additive for a multi-use oil-based flame-resistant organic fluid for safely releasing corroded joints and fasteners and other general use purposes. The oil-based organic fluid includes a flame-resistant additive such as a carboxylated aromatic compound, which has a self-extinguishing effect on an arc of flame. The inclusion of carboxylated aromatic compounds release carbon dioxide when heated, causing the material to extinguish itself during ignition to resist catching on fire.

23 Claims, No Drawings

FLAME-RESISTANT ADDITIVES FOR OIL-BASED PRODUCTS AND OIL-BASED PRODUCTS CONTAINING FLAME-RESISTANT ADDITIVES

I. BACKGROUND

A. Technical Field

Provided is a flame-resistant additive and an oil based organic fluid containing a flame-resistant additive. The organic fluid may be designed to function as a general purpose multi-use product or as lubricant or penetrant oil. As a lubricant or penetrant oil, the oil-based flame-resistant organic fluid may be used to break lose corroded joints in both commercial and industrial applications. Also provided is a method for making an oil-based flame-resistant organic fluid having such flame-resistant additives.

B. Description of Related Art

Corrosion of mechanical joints often results in those joints being frozen or seized together, which in many cases makes disengagement of the mechanical joint virtually impossible. Lubricating and Penetrant oils are liquid products often packaged within pressurized aerosol cans. They are applied to corroded joints to loosen the binding effects of the corrosive matter and to assist in breaking the component parts of a corroded joint free from each other. In most cases, it is recommended that the lubricating or penetrant oil be permitted to soak or otherwise remain in contact with the component parts of the joint for a certain period of time before attempting to loosen the joint. This allows the lubricating or penetrant oil to reach its maximum potential for assisting in breaking the bond that the corrosive material has on the joint. Examples of the types of joints lubricating and penetrant oils are applied to include but are not limited to nuts, bolts, screws, flanges, couplings, fittings, studs and any other type of threaded joint which is corroded.

When an oil is sprayed, it generates fine droplets and fumes. These fumes can catch fire very easily as they are highly combustible. The flame from a newly ignited fire may track back into the can, causing it to burst. This safety risk is magnified when the oil is applied to corroded joints positioned near electrical switches and relays. These types of devices increase the risk of an electrical flashover occurring within the immediate environment. Electrical flashovers generate high temperatures, ozone, and nitrogen oxides within the immediate environment, which creates a great potential for ignition. If the oil is ignited under such circumstances, a series of fire and safety hazards may occur, such as an explosion of the spray can containing the oil. This type of event can cause individuals to suffer significant harm within the work space, damage equipment and facilities and present a risk to life.

What is therefore needed in the art are oil-based products which are less flammable than currently available products and which are capable of mitigating the risk of potential fires, especially when the product is used within the vicinity of electrical components. The oil-based flame-resistant organic fluid and flame resistant additive provided herein is capable of greatly reducing the flammability of these fumes, mitigates the risk of potential fires and enables individuals to work in a safe environment.

II. SUMMARY

Provided is an oil-based flame-resistant organic fluid. The oil-based flame-resistant organic fluid may be in the form of a penetrant oil, a lubricant or a multi-use product. In certain aspects of the present teaching, the oil-based flame-resistant is in the form of an aerosol fluid. The oil-based flame-resistant organic fluid includes an oil; a solvent; and a flame-resistant additive capable of reducing the flammability of the oil-based organic fluid. In certain cases, the oil may be a halogen-free oil. The oil-based flame-resistant organic fluid may or may not include a surfactant. In certain cases, the flame-resistant additive renders the oil-based organic fluid non-flammable. In other cases, the flame-resistant additive renders the oil-based organic fluid non-flammable and has a self-extinguishing effect when sprayed onto an electrical arc or open flame.

According to certain aspects of the present teaching, the flame-resistant additive is a carboxylated aromatic compound. The flame-resistant additive may be a carboxylated derivative of benzene, naphthalene, phenathrene, anthracene or mixtures thereof. The carboxylated aromatic compound may be selected from the group consisting of mellitic acid, pyromellitic acid, trimellitic acid, trimesic acid or mixtures thereof. According to certain aspects of the present teaching, the flame-resistant additive is mellitic acid. In other embodiments, the flame-resistant additive used within the oil-based flame-resistant organic fluid composition is pyromellitic acid. In other embodiments, the flame-resistant additive used within the oil-based organic fluid composition is trimellitic acid. In other embodiments, the flame-resistant additive used within the oil-based flame-resistant organic fluid composition is trimesic acid.

According to certain aspects of the present teaching, the oil used within the oil-based flame-resistant organic fluid composition is a synthetic oil.

According to certain aspects of the present teaching, the oil used within the oil-based flame-resistant organic fluid is a mineral oil, a plant-based oil, a semi-synthetic oil, a synthetic oil, an ester oil, a polyalphaolefin (PAO) oil or mixtures thereof.

According to certain aspects of the present teaching, the synthetic oil used within the oil-based flame-resistant organic fluid composition is a light ester oil or a polyalphaolefin (PAO) oil.

The oil-based flame-resistant organic fluid composition may also include any number of additives to improve certain properties of the composition. According to certain aspects of the present teaching, the oil-based flame-resistant organic fluid composition may include extra pressure additives, corrosion inhibitors, dispersants and combinations thereof.

According to certain aspects of the present teaching, the oil-based flame-resistant organic fluid composition may include a propellant such as carbon dioxide, nitrogen, a halocarbon or other non-flammable gas. In such embodiments, the oil-based flame-resistant organic fluid composition and propellant may be packaged within an aerosol can.

Further provided is a method of making an oil-based flame-resistant organic fluid. The method includes the following steps: providing a halogen-free oil-based organic fluid, a solvent; and a flame-resistant additive capable of reducing the flammability of the oil-based organic fluid wherein the flame-resistant additive comprises a carboxylated aromatic compound; and mixing the oil, solvent and flame-resistant additive within the penetrant oil to form an oil-based flame-resistant organic fluid which is non-flammable and which has a self-extinguishing effect when sprayed onto an electrical arc or open flame. According to certain aspects of the present teaching, the oil, solvent and flame-resistant additive are held under conditions of constant mixing for one hour or about or approximately one hour. Also, the flame-resistant additive and other additives may be added to the mixture in parts while the solution is held under conditions of constant mixing to prevent clumping. According to further aspects of the present teaching, the solution is not heated during the mixing process where a polyalphaolefin oil is used as the base oil. However, in other embodiments, the solution is heated to 100° C. or about or approximately 100° C. during mixing where an ester is used as the base oil.

According to certain aspects of the present teaching, the method includes the step of adding a propellant and the oil-based flame-resistant organic fluid into a pressurized spray can.

III. DETAILED DESCRIPTION

Provided is an oil-based organic fluid. The oil-based flame-resistant organic fluid may be a lubricant or lubricating oil, a penetrant oil, or a general purpose multi-use oil-based product. In certain aspects of the present disclosure, the oil-based flame-resistant organic fluid is designed in the form of an aerosol fluid which can be sprayed under pressure. When used as a lubricant and/or a penetrant, the oil-based flame-resistant organic fluid assists in breaking away or breaking loose corroded joints from each other. Alternatively, as a general purpose multi-use product, the oil-based flame-resistant organic fluid may be used as a general-purpose lubricant, a rust inhibitor, a cleaning agent, a paint remover, an insecticide as well as numerous other uses. The oil-based flame-resistant organic fluid is a low viscosity fluid and is designed to have a self-extinguishing effect when sprayed into an arc or a flame. The self-extinguishing effect resists the arc or flame, and prevents it from propagating into a fire which can pose a threat to individual safety and which can damage equipment and various structures within the working environment.

Oil-based organic fluids generally comprise two parts: a base oil and a solvent (to reduce viscosity). The oil-based flame-resistant organic fluid of the present formulation is composed primarily of an oil that has low viscosity and low surface tension and enables the liquid to penetrate in-between corroded or otherwise frozen or seized joints and fasteners and other areas. Lubricants such as synthetic, semi-synthetic or mineral-based oils may be used to formulate the oil-based flame-resistant organic fluid disclosed herein. There are many different types of synthetic oils which may be classified as full synthetics and semi-synthetics as well as numerous additives which may be added to synthetic and semi-synthetic oil formulations. Examples of full synthetic oil compounds include poly-alpha-olefin oils (formed by polymerizing an alpha-olefin) and ester-based synthetic oils formed by condensing a carboxylic acid with an alcohol. Semi-synthetic oil compounds are essentially a mixture of mineral oil and synthetic oil and in some cases, natural oils. As mentioned above, the oil-based flame-resistant organic fluid as presently disclosed may include any type of synthetic or semi-synthetic oil known by those of ordinary skill in the art for having properties which are compatible for functioning as a lubricant, a penetrant oil and a general multi-use spray. Examples of synthetic oils that may be used in the present formulation may include poly-alpha olefin oils, silicone oils, diester oils, and poly-ol ester oils. According to certain aspects of the present teaching, the oil-based flame-resistant organic fluid is formulated from an ester oil. According to further aspects of the present teaching, the oil-based flame-resistant organic fluid is formulated from a naphthenic or paraffinic mineral oil. In other formulations, a natural plant-based oil may be used in the formulation.

According to certain aspects of the present teaching, the oil-based flame-resistant organic fluid formulation does not include synthetic oils which are halogenated (e.g., perfluoropolyether oils). Such oils have very limited solubility and solvency. Furthermore, halogenated fluids such as perfluoropolyether oils are non-flammable and release halogen instead of hydrogen in the presence of heat. This causes the oil to smother itself. Accordingly, the oil-based organic fluid of the presently disclosed formulation is halogen-free.

According to certain aspects of the present teaching, the oil-based flame-resistant organic fluid formulation includes a poly-alpha-olefin as a base oil. Poly-alpha-olefins that may be used as a base oil within the oil-based flame-resistant organic fluid formulation include but are not limited to any poly-alpha-olefin having a carbon chain length ranging from C10 to C30 and mixtures thereof.

As mentioned above, ester oils and ester-based oils that may be used as a base oil within the oil-based flame-resistant organic fluid formulation. This category of oils includes the use of polyol esters, ester-ol and diester oils. Ester oils, including polyol ester oils, ester-ol oils, diester oils and mixtures thereof allow for the absorption of additives, including flame-resistant additives such as carboxylated aromatic compounds. The ease in absorption of additives within ester-based oils is due to the inherent polarity of ester-based oils. According to certain aspects of the present teaching, the oil used within the flame-resistant penetrant oil formulation is a pure ester meaning it includes approximately one hundred percent ester oil. In other embodiments, the oil used within the flame-resistant penetrant oil formulation includes from about 10% to about 50% of a natural or synthetic ester oil and at least one other type of a synthetic, semi-synthetic or mineral based oil.

According to certain aspects of the present teaching, the oil-based flame-resistant organic fluid formulation includes a diester as a base oil. Examples of diester oils that may be used as a base oil within the oil-based flame-resistant organic fluid formulation include but are not limited to diester oils formed from the esterification of a dicarboxylic acid and an alcohol. According to certain aspects of the present teaching, the dicarboxylic acid used in the esterification reaction has a carbon chain length ranging from C2 to C8 and the alcohol used in the esterification reaction has a carbon chain length ranging from C4 to C8. According to further aspects of the present teaching, the oil-based flame-resistant organic fluid formulation includes a mixture of different types of diester oils.

According to certain aspects of the present teaching, the oil-based flame-resistant organic fluid formulation includes a polyol as a base oil. According to certain aspects of the present teaching, the polyol oil is a polyol ester. Examples of polyol esters that may be used as a base oil within the oil-based flame-resistant organic fluid formulation include but are not limited to polyol esters having a carbon chain length ranging from C5 to C18. According to further aspects of the present teaching, the polyol ester is at least one of pentaerythritol, glycerol, mannitol, innositol, sorbitol, dipentaerithritol, a phosphate-containing polyol ester and mixtures thereof.

According to certain aspects of the present teaching, the oil-based flame-resistant organic fluid formulation includes a silicone as a base oil. Examples of silicone oils that may be used as a base oil within the oil-based flame-resistant organic fluid formulation include but are not limited to polydimethyl and polyphenylmethyl siloxanes having a silicone chain length ranging from Si10 to Si20.

According to certain aspects of the present teaching, the oil-based flame-resistant organic fluid formulation includes a naphthenic mineral oil as base oil. According to other aspects of the present teaching, the oil-based flame-resistant organic fluid formulation includes a paraffinic mineral oil as a base oil. According to further aspects of the present teaching, the oil-based flame-resistant organic fluid formulation includes a mixture of paraffinic and naphthenic mineral oils as a base oil.

According to certain aspects of the present teaching, the oil-based flame-resistant organic fluid formulation includes a natural plant-based oil as a base oil. Examples of natural plant-based oils that may be used as a base oil within the oil-based flame-resistant organic fluid formulation include but are not limited to natural ester oils such as soybean oil, corn oil, nut oil, olive oil, cotton seed oil and mixtures thereof.

According to certain aspects of the present teaching, the oil-based flame-resistant organic fluid formulation includes a mixture of any of the oils mentioned above.

In certain aspects of the present teaching, the oil-based flame resistant organic fluid includes a solvent which acts to reduce the viscosity of the oil or lubricant employed within the formulation. Solvents used within oil-based organic fluids are typically aliphatic hydrocarbons. Examples of solvents which may be used within the oil-based flame resistant organic fluid disclosed herein include, but are not limited to, acetone, alcohols, hydro-treated petroleum distillates, propylene carbonates, propylene glycol methyl ether acetate, naphtha, and turpentine.

Many solvents used within oil-based organic fluids are volatile, which results in an increase in the flammability of the formulation. The present disclosure provides various types of flame-resistant additives which may be incorporated into the formulation of the oil-based organic fluid to counteract this effect. According to certain aspects of the present teaching, the oil-based organic fluid formulation includes an additive such as a carboxylated aromatic compound for reducing the flammability of the organic fluid. In further embodiments, the carboxylated aromatic compound is capable of eliminating the flammability of the oil-based organic fluid and is even capable of having a self-extinguishing effect when sprayed onto an open flame or electrical arc. Carboxylated aromatic compounds, as used in the present formulation generally refer to carboxylated derivatives of benzene, naphthalene, anthracene, phenanthrene and mixtures thereof. Examples of carboxylated aromatic compounds which may be used as an additive within the oil-based organic fluid formulation disclosed herein include but are not limited to mellitic acid (1,2,3,4,5,6-hexacarboxylic acid), pyromellitic acid (1,2,4,5-tetracarboxybenzene), trimellitic acid (1,2,4-tricarboxybenzene), and trimesic acid (1,2,5-tricarboxylic acid), phenanthrene dicarboxylic acid, anthacene carboxylic acid, di-carboxy anthracene, benzoic acid, phenanthracene carboxylic acid, naphthoic acid, phthalic acid, derivatives thereof and mixtures thereof.

Oil-based organic fluid formulations which do not contain a flame-resistant additive are known for being flammable in nature. Such fluids may set off ignition if conditions are right and can exacerbate existing fires. Oil-based organic fluid formulations containing a flame-resistant additive such as aromatic carboxylated compounds, however, have been shown to produce carbon dioxide in a reaction vessel with the application of heat. Without being bound to any particular theory, it is believed that when the flame-resistant additive is heated to a certain temperature, the carboxylate group within the aromatic carboxylated compound decomposes and produces carbon dioxide. This process is referred to as decarboxylation. In the presence of heat, carbon dioxide is released from the fluid upon application of the fluid to the desired article and the flame-resistant additive hydrogenates. As a result, the area surrounding the article is dominated by the presence of carbon dioxide. The carbon dioxide supplants the presence of oxygen surrounding the article, leaving an insufficient amount of oxygen to act as a fuel for ignition and combustion and rendering the area surrounding the article less prone to ignition and combustion.

According to certain aspects of the present teaching, the oil-based flame-resistant organic fluid does not include a surfactant. However, according to other aspects of the present teaching, the oil-based flame-resistant organic fluid formulation may include a surfactant.

The oil-based flame-resistant organic fluid formulation of the present disclosure may incorporate the use of numerous additives in addition to the flame-resistant additive. Such additional additives include but are not limited to extra pressure additives (to improve wear resistance and lubricate metal surfaces), corrosion inhibitors and dispersants. Examples of extra pressure additives that may be used within the oil-based flame-resistant organic fluid formulation include but are not limited to compounds which contain sulfur, phosphorous, chlorine and combinations thereof.

The oil-based flame-resistant organic fluid formulation may also include a propellant such as carbon dioxide, nitrogen, a Freon (halocarbons) to enable the oil-based organic fluid to be dispersed from a pressurized spray can. Accordingly, also provided is a method of making a pressurized spray can containing the oil-based flame-resistant organic fluid formulation and a propellant wherein the oil-based flame-resistant organic fluid and the propellant are incorporated into a pressurized spray can.

According to certain aspects of the present teaching, the oil-based flame-resistant organic fluid formulation includes the following range of components: from about 0 to about 90 weight percent oil, from about 0 to about 40 weight percent solvent, from about 5 to about 20 weight percent flame-resistant additive and from about 1 to about to about 10 weight percent of additional additives.

According to further aspects of the present teaching, the oil-based flame-resistant organic fluid formulation includes the following range of components: from about 0 to about 90 weight percent oil, from about 0 to about 40 weight percent solvent, from about 0 to about 5 weight percent surfactant and greater than 0 to about 10 weight percent flame-resistant additive and other additives (total additives).

According to further aspects of the present teaching, the amount of flame-resistant additive present within the formulation may range from greater than 0 to about 10 weight percent. In further aspects of the present teaching, the amount of flame-resistant additive within the formulation may range from about 1 to about 5 weight percent, from about 2 to about 5 weight percent, from about 3 to about 5 weight percent, from about four to about 5 weight percent, from about 1 to about 10 weight percent, from about 2 to about 10 weight percent, from about 3 to about 10 weight percent, from about four to about 10 weight percent, from about 5 to about 10 weight percent, from about 6 to about 10 weight percent from about 7 to about 10 weight percent from about 8 to about 10 weight percent, from about 9 to about 10 weight percent, from about 11 to about 20 weight percent, from about 12 to about 20 weight percent, from about 13 to about 20 weight percent, from about 14 to about 20 weight percent, from about 15 to about 20 weight percent, from about 16 to about 20 weight percent, from about 17 to about 20 weight percent, from about 18 to about 20 weight percent and from about 19 to about 20 weight percent. In still further aspects of the present teaching, the amount of flame-resistant additive within the formulation may be about 1 weight percent, about 2 weight percent, about 3 weight percent, about 4 weight percent, about 5 weight percent, about 6 weight percent, about 7 weight percent, about 8 weight percent, about 9 weight percent, about 10 weight percent, about 11 weight percent, about 12 weight percent, about 13 weight percent, about 14 weight percent, about 15 weight percent, about 16 weight percent, about 17 weight percent, about 18 weight percent, about 19 weight percent and about 20 weight percent.

Also provided herein is a method for making an oil-based flame-resistant organic fluid containing a flame-resistant additive. The method includes the following steps: providing an oil, a solvent and a flame-resistant additive capable of reducing the flammability of the oil and mixing the oil and mixing the oil and solvent while adding additives, including the flame-resistant additive to the solution. The mixing step may occur at ambient temperature without applying heat to the solution where a polyalphaolefin oil is used as the base oil or may include heating the solution to a temperature of 100° C. or about or approximately 100° C. where an ester is used as the base oil. In certain aspects of the present disclosure, solid additives are added to the solution in parts to prevent clumping. The flame-resistant additive mixed with the oil may be a carboxylated aromatic compound. The resulting oil-based organic fluid containing the flame-resistant additive is non-flammable and has a self-extinguishing effect when sprayed onto an electrical arc or open flame.

Various amounts of oil, solvent and flame resistant additive may be combined in the mixing of components to form the oil-based flame-resistant additive. In certain aspects of the present teaching, the formulation includes a certain mixing ratio of oil and solvent to flame-resistant additive.

As mentioned above, in certain aspects of the present disclosure, the mixing of components forming the oil-based flame-resistant organic fluid in solution occurs at ambient temperature without the application of heat where a polyalphaolefin is used as a base oil and at a temperature of 100° C. or about or approximately 100° C. where an ester is used as the base oil. However, under certain scenarios, mixing the flame-resistant additive under certain ambient conditions will not result in the complete saturation of the flame-resistant additive within the organic fluid formulation. Therefore, according to further aspects of the present disclosure, it is desirable to mix the components of the oil-based flame-resistant organic fluid at a temperature below ambient temperature to achieve full saturation of the flame-resistant additive within the formulation.

The oil-based flame-resistant organic fluid has been tested for flammability and safety and meets ASTM 3065D Standard Test Methods for Flammability of Aerosol Products, which is herein incorporated by reference in its entirety. The oil-based flame-resistant organic fluid has been determined to be safe for use on energized electrical switches.

Numerous embodiments have been described herein. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof. The phrase "associated with" as used in this document, refers to structures which support the disclosed device and may also refer to structures not disclosed herein capable of supporting the disclosed device. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. An oil-based flame-resistant organic fluid comprising:
   a halogen-free oil;
   a solvent; and
   a flame-resistant additive capable of reducing the flammability of the oil-based organic fluid wherein the flame-resistant additive comprises mellitic acid.

2. The oil-based flame-resistant organic fluid of claim 1, wherein the flame-resistant additive is selected from the group consisting of carboxylated derivatives of benzene, naphthalene, phenanthrene, anthracene, and mixtures thereof.

3. The oil-based flame-resistant organic fluid of claim 1, wherein the flame-resistant additive further comprises one of pyromellitic acid, trimellitic acid, trimesic acid or mixtures thereof.

4. The oil-based flame-resistant organic fluid of claim 2, wherein the halogen-free oil is a synthetic oil.

5. The oil-based flame-resistant organic fluid of claim 2, wherein the halogen-free oil is selected from the group consisting of a mineral oil, a plant-based oil, a synthetic oil, an ester oil, a polyalphaolefin (PAO) oil and mixtures thereof.

6. The oil-based flame-resistant organic fluid of claim 5, wherein the halogen free oil comprises a polyalphaolefin oil, wherein the polyalphaolefin oil comprises any poly-alpha-olefin having a carbon chain length ranging from C10 to C30 and mixtures thereof.

7. The oil-based flame-resistant organic fluid of claim 5, wherein the halogen free oil comprises an ester oil, wherein the ester oil comprises a polyol ester oil, an ester-ol oil, a diester oil or mixtures thereof.

8. The oil-based flame-resistant organic fluid of claim 5, further comprises at least one of extra pressure additives, corrosion inhibitors and dispersants.

9. The oil-based flame-resistant organic fluid of claim 5, further comprising a propellant, wherein the oil-based flame-resistant organic fluid and propellant are packaged within an aerosol can.

10. The oil-based flame-resistant organic fluid of claim 9, wherein the propellant is one of carbon dioxide, nitrogen, a halocarbon or other non-flammable gas.

11. The oil-based flame-resistant organic fluid of claim 5, wherein the flame-resistant additive renders the oil-based flame-resistant organic fluid non-flammable.

12. The oil-based flame-resistant organic fluid of claim 11, wherein the flame-resistant additive has a self-extinguishing effect when sprayed onto an electrical arc or open flame.

13. The oil-based flame-resistant organic fluid formulation of claim 1, wherein the formulation does not include a surfactant.

14. A method of making an oil-based flame-resistant organic fluid comprising;
   providing an oil-based organic fluid comprising a halogen-free oil, a solvent; and a surfactant; and
   mixing a solution of halogen-free oil and solvent;
   adding a flame-resistant additive capable of reducing the flammability of the oil to the solution to form an oil-based organic fluid which is non-flammable and has a self-extinguishing effect when sprayed onto an electrical arc or open flame, adding a propellant and the oil-based flame-resistant organic fluid into a pressurized spray can,
wherein the flame-resistant additive comprises a carboxylated aromatic compound.

15. The method of claim 14, wherein the flame-resistant additive is selected from the group consisting of carboxylated derivatives of benzene, naphthalene, phenanthrene, anthracene, and mixtures thereof.

16. The method of claim 15, wherein the oil within the oil-based organic fluid is a polyalphaolefin (PAO) or an ester wherein the solution is not heated during mixing when the oil-based organic fluid is a polyalphaolefin (PAO) and wherein the solution is heated to a temperature of 100° C. or about 100° C. when the oil-based organic fluid is an ester.

17. The method of claim 16, further comprising adding extra pressure additives, corrosion inhibitors and dispersants to the oil-based flame-resistant organic fluid.

18. The method of claim 14, wherein the mixing step lasts for approximately one hour.

19. The method of claim 15, wherein the flame-resistant additive is one of mellitic acid, pyromellitic acid, trimellitic acid, trimesic acid, phenanthrene dicarboxylic acid, anthracene carboxylic acid, di-carboxy anthracene, benzoic acid, phenanthracene carboxylic acid, naphthoic acid, phthalic acid, and derivatives thereof.

20. A method of making an oil-based flame-resistant organic fluid comprising;
providing an oil-based organic fluid comprising a halogen-free oil, a solvent; and a surfactant; and
mixing a solution of halogen-free oil and solvent;
adding a flame-resistant additive capable of reducing the flammability of the oil to the solution to form an oil-based organic fluid which is non-flammable and has a self-extinguishing effect when sprayed onto an electrical arc or open flame,
wherein the flame-resistant additive is mellitic acid.

21. An oil-based flame-resistant organic fluid comprising:
a halogen-free oil;
a solvent; and
a flame-resistant additive capable of reducing the flammability of the oil-based organic fluid wherein the flame-resistant additive comprises trimesic acid.

22. The oil-based flame-resistant organic fluid of claim 21, wherein the flame-resistant additive further comprises one or both of pyromellitic acid and trimellitic acid.

23. An oil-based flame-resistant organic fluid comprising:
a halogen-free oil;
a solvent;
a flame-resistant additive capable of reducing the flammability of the oil-based organic fluid wherein the flame-resistant additive comprises a carboxylated aromatic compound selected from the group consisting of carboxylated derivatives of benzene, naphthalene, phenanthrene, anthracene, and mixtures thereof and
a propellant, wherein the oil-based flame-resistant organic fluid and propellant are packaged within an aerosol can,
wherein the halogen-free oil is selected from the group consisting of a mineral oil, plant-based oil, a synthetic oil, an ester oil, a polyalphaolefin (PAO) oil and mixtures thereof.

* * * * *